United States Patent
Summers-Lepine et al.

(10) Patent No.: US 10,801,441 B2
(45) Date of Patent: Oct. 13, 2020

(54) FLOW MIXER STIFFENER RING SEGMENTED SPRINGS

(71) Applicant: PRATT & WHITNEY CANADA CORP., Longueuil (CA)

(72) Inventors: Daniel Summers-Lepine, St-Bruno-de-Montarville (CA); Philippe Boyer, Saint-Remi (CA); Assaf Farah, Brossard (CA); Daniel Coutu, Longueuil (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 296 days.

(21) Appl. No.: 16/204,259

(22) Filed: Nov. 29, 2018

(65) Prior Publication Data
US 2020/0025131 A1     Jan. 23, 2020

Related U.S. Application Data

(60) Provisional application No. 62/632,659, filed on Feb. 20, 2018.

(51) Int. Cl.
*F02K 1/38* (2006.01)
*F02K 1/48* (2006.01)

(52) U.S. Cl.
CPC .............. *F02K 1/386* (2013.01); *F02K 1/48* (2013.01); *F05D 2260/96* (2013.01)

(58) Field of Classification Search
CPC ... F02K 1/386; F02K 1/46; F02K 1/48; B64D 33/04; B64D 33/06; B64D 2033/045
See application file for complete search history.

(56) References Cited

U.S. PATENT DOCUMENTS

| | | | | |
|---|---|---|---|---|
| 4,117,671 A | * | 10/1978 | Neal | F02K 1/386 239/127.3 |
| 4,147,029 A | * | 4/1979 | Sargisson | F02C 7/042 137/15.1 |
| 9,284,915 B2 | | 3/2016 | Lefebvre et al. | |
| 10,018,150 B2 | * | 7/2018 | Marini | F02K 1/386 |
| 2013/0115051 A1 | | 5/2013 | Bouchard et al. | |
| 2013/0115076 A1 | | 5/2013 | Bouchard et al. | |
| 2015/0075169 A1 | * | 3/2015 | Cunningham | F01D 9/041 60/770 |
| 2015/0337761 A1 | * | 11/2015 | Marini | F02K 1/386 415/144 |

(Continued)

OTHER PUBLICATIONS

European Search Report issued in corresponding EP application No. 19158394.7 dated Oct. 9, 2019.

*Primary Examiner* — William H Rodriguez
(74) *Attorney, Agent, or Firm* — Norton Rose Fulbright Canada LLP

(57) ABSTRACT

A gas turbine engine comprises a main gas path having an inner flow boundary wall and an outer flow boundary wall. A turbine exhaust case inner body defines a portion of the inner flow boundary wall of the main gas path. A lobed exhaust mixer defines a portion of the outer flow boundary wall of the main gas path. A stiffener ring is interconnected to at least a number lobes of the lobed exhaust mixer by a plurality of circumferentially spaced-apart struts extending through the main gas path. The stiffener ring is attached to the turbine exhaust case inner body by flexible features, such as circumferentially spaced-apart spring blades.

20 Claims, 3 Drawing Sheets

(56) References Cited

U.S. PATENT DOCUMENTS

2016/0032864 A1    2/2016  Di Paola et al.
2016/0326983 A1*  11/2016  Marini ..................... F02K 3/06
2016/0376928 A1  12/2016  Lefebvre et al.
2019/0249620 A1*  8/2019  Boyer ..................... F02K 1/386

* cited by examiner

FLOW MIXER STIFFENER RING SEGMENTED SPRINGS

CROSS-REFERENCE TO RELATED APPLICATIONS

This application claims priority from U.S. provisional patent application No. 62/632,659, filed Feb. 20, 2018, the entire content of which is incorporated by reference herein.

TECHNICAL FIELD

The application relates generally to aircraft gas turbine engines and, more particularly, to exhaust mixers thereof.

BACKGROUND OF THE ART

In turbofan gas turbine engines, high velocity exhaust gases from the turbofan core are mixed with low velocity air from the bypass duct, and these mixed gases are then exhausted from the engine. Such turbofan engines generally use exhaust mixers in order to increase the mixing of the high and low velocity exhaust gas flows. Exhaust mixers may experience thermal variation and/or radial deflection due to exposure to the high and low velocity flows. In addition, exhaust mixers may be prone to vibrations, which have negative consequences for the surrounding hardware. As such, it is generally desirable to increase the stiffness or rigidity of the exhaust mixer. Various configurations of exhaust mixers have been used to date in order to try to increase the stiffness or reduce deflection thereof. However, most of the prior art methods or configurations involve significant drawbacks.

Therefore, there remains a need for an improved exhaust mixer for a gas turbine engine.

SUMMARY

In one aspect, there is provided a gas turbine engine exhaust mixer comprising a body defining a plurality of circumferentially distributed alternating inner and outer lobes, and a stiffener ring connected to the inner lobes via struts extending radially inwardly from at least some of the inner lobes, the stiffener ring being connect to a turbine exhaust case inner body via a flexible structure configured to alter a natural frequency of the exhaust mixer.

According to another aspect, the flexible structure between the stiffener ring and the turbine exhaust case inner body acts as a damper to damp mixer mode shapes that can result from a fluid structure interaction between the mixer and the gaspath flow.

According to another general aspect, the flexible structure includes at least one spring blade connected at a first end thereof to the stiffener ring and at a second end thereof to the turbine exhaust case inner body. The spring blade allows radial and axial relative movement between the stiffener ring and the turbine exhaust case inner body while restricting relative tangential movement therebetween.

In another aspect, there is provided a gas turbine engine comprising: a core gas path extending along an engine axis; a bypass gas path surrounding the core gaspath; a turbine exhaust case inner body having an outer surface defining a portion of a radially inner flow boundary wall of the core gaspath; and a lobed exhaust mixer surrounding at least a portion of the turbine exhaust case inner body and defining an intermediate wall between the core gaspath and the bypass gas path, the lobed exhaust mixer including: lobes, a stiffener ring, a plurality of circumferentially spaced-apart struts extending from the stiffener ring to at least some of the lobes, and at least one spring extending from a radially inner surface the stiffener ring to a radially outer surface of the turbine exhaust case inner body.

In another aspect, there is provided an exhaust mixer of a gas turbine engine mounted at an exhaust of the gas turbine engine such as to at least partially surround an inner body of a turbine exhaust case, the exhaust mixer comprising: an annular wall having an upstream end and a downstream end forming a plurality of circumferentially distributed alternating inner and outer mixer lobes; and a support member disposed upstream of the downstream end of the annular wall and interconnecting at least a number of the inner lobes, the support member including a stiffener ring located radially inwardly from the inner lobes, a series of circumferentially spaced apart mixer struts radially extending from the inner lobes to the stiffener ring, and circumferentially distributed spring members connecting the stiffener ring to the inner body of the turbine exhaust case.

In accordance with a further general aspect, there is provided a gas turbine engine comprising: a main gaspath extending along an axis and having a radially inner flow boundary wall and a radially outer flow boundary wall; a turbine exhaust case inner body having an outer surface defining a portion of the radially inner flow boundary wall of the main gaspath; a lobed exhaust mixer surrounding at least a portion of the turbine exhaust case inner body and defining a portion of the radially outer flow boundary wall of the main gaspath; a support member comprising a stiffener ring interconnected to lobes of the lobed exhaust mixer by a series of circumferentially spaced-apart struts extending radially through the main gaspath, and at least one spring extending from a radially inner surface the stiffener ring to a radially outer surface of the turbine exhaust case inner body.

In accordance with a still further aspect, there is provided a gas turbine engine having an engine casing enclosing a compressor section, a combustor and a turbine section defining a main gaspath axially extending therethrough, and comprising: an exhaust cone disposed downstream of the turbine section; an exhaust mixer cantilevered from the engine casing and cooperating with the exhaust cone such as to define a portion of the main gaspath therebetween, the exhaust mixer having a plurality of circumferentially distributed lobes connected at a radially inner side by a stiffener ring; and a set of circumferentially spaced-apart spring blades having respective front ends attached to the stiffener ring and respective rear ends attached to the exhaust cone, the front ends being positioned axially forward and radially outward of the rear ends, the spring blades jointly forming an axially and radially flexible segmented ring structure between the stiffener ring and the exhaust cone.

BRIEF DESCRIPTION OF THE DRAWINGS

Reference is now made to the accompanying figures in which.

DETAILED DESCRIPTION

Figure 1:
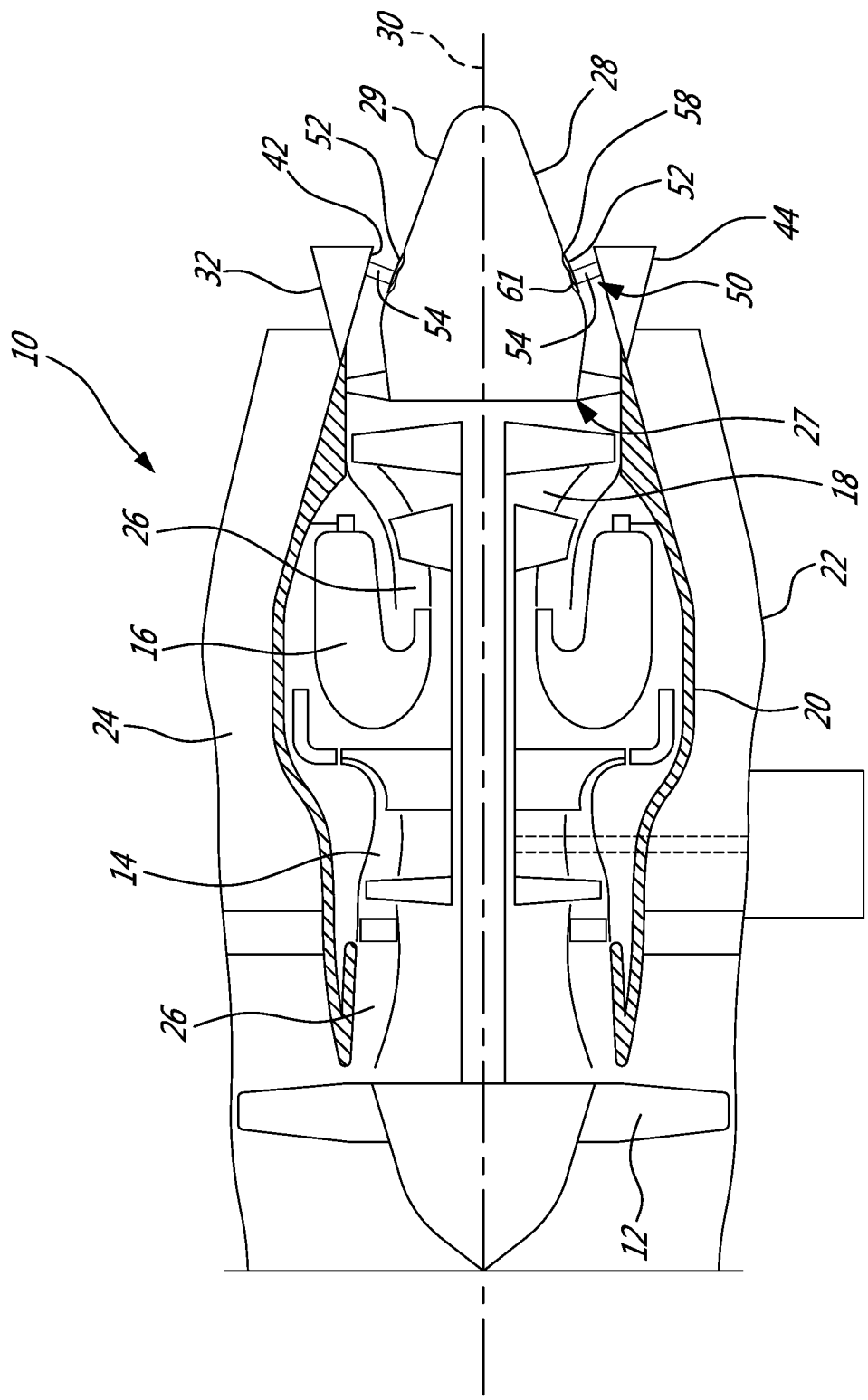
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a core engine casing 20 which encloses the turbo machinery of the engine, and an outer casing 22 disposed radially outwardly of the core engine casing 20 such as to define an annular bypass passage 24 therebetween. The air propelled by the fan 12 is split into a first portion which flows around the core engine casing 20 within the bypass passage 24, and a second portion which flows through the core of the engine via a core or main gas path 26, which is circumscribed by the core engine casing 20 and allows the flow to circulate through the multistage compressor 14, combustor 16 and turbine section 18 as described above.

The turbine section 18 comprises a turbine exhaust case inner body 27 including an exhaust cone 28 centered about a longitudinal axis 30 of the engine 10. The turbine exhaust case inner body 27 has an outer surface 29, which defines an aft portion of an inner flow boundary wall of the main gaspath 26 so that the combustion gases flow thereover.

An annular exhaust mixer 32 surrounds at least a portion of the turbine exhaust case inner body 27. The mixer 32 is connected at a front end thereof to an aft portion of the core engine casing 20. Typically, the mixer 32 is bolted to a rear flange of the core engine case 20. The annular exhaust mixer 32 at least partially acts as an extension of a rearmost portion of the outer wall of the main gaspath 26 and a rearmost portion of the inner wall of the bypass passage 24. The hot combustion gases from the main gaspath 26 and the cooler air from the bypass passage 24 are thus mixed together by the mixer 32 such as to produce an engine exhaust yielding a greater thrust.

Referring concurrently to FIGS. 1-4, the mixer 32 includes an annular wall or body defining a plurality of circumferentially distributed lobes extending rearwardly from an upstream end to a downstream end, i.e. a trailing edge. The mixer lobes include alternating inner radial lobes 42 and outer radial lobes 44, with the outer lobes 44 extending into the bypass passage 24 and the inner lobes 42 extending into the main engine core gaspath 26.

Figure 2:
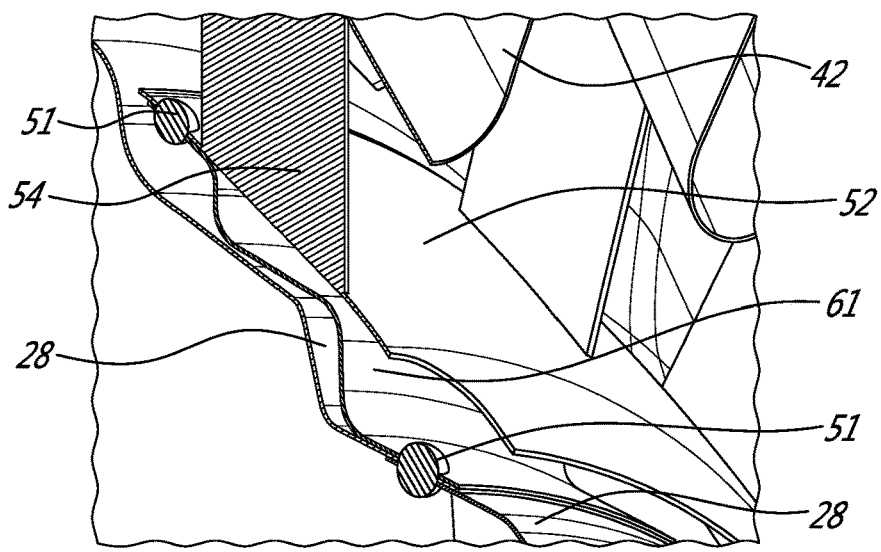
FIG. 2 is an enlarged rear isometric view of a portion of the exhaust mixer illustrating a stiffener ring connected to mixer lobes and to an exhaust cone via flexible members, in accordance with embodiments of the present disclosure.
Figure 3:
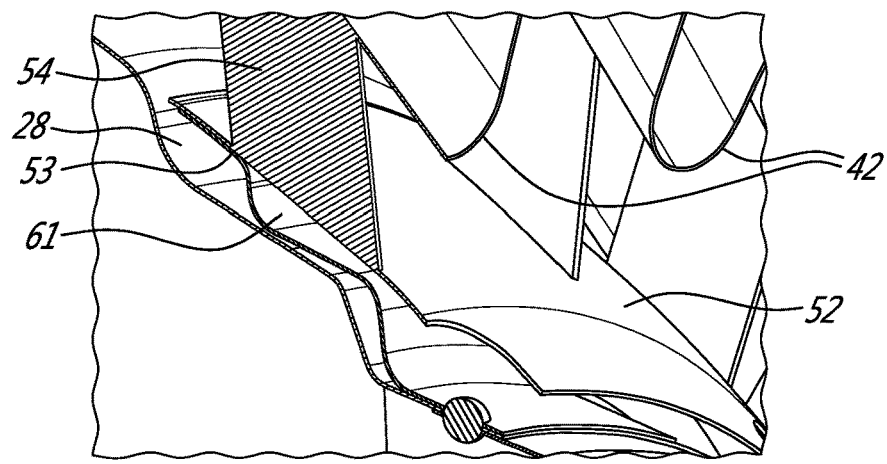
FIG. 3 is a rear isometric view illustrating another way of attaching the flexible members to the stiffener ring.
Figure 4:
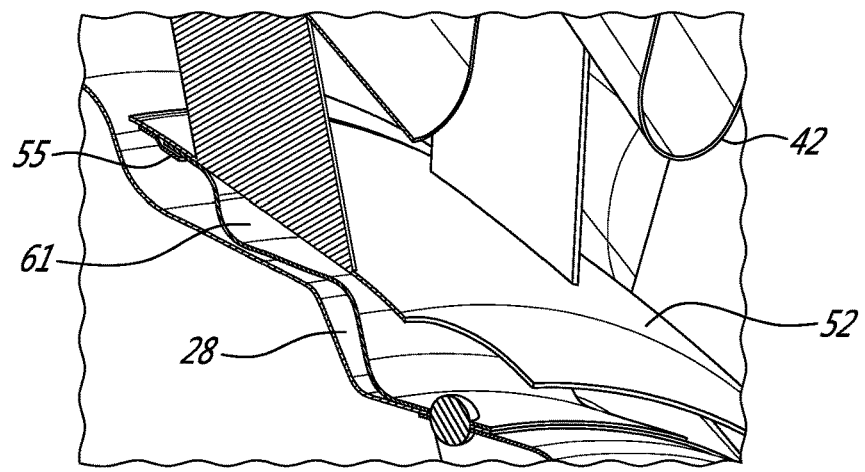
FIG. 4 is a rear isometric view illustrating a further way of attaching the flexible members to the stiffener ring.

The lobed mixer 32 is solely connected to and supported at the upstream end thereof by the aft end of the core engine casing 20. In other words, the mixer 32 is cantilevered from the engine casing 20. In order to provide additional support to the mixer 32, the mixer 32 includes a support member 50 connected to at least some of the lobes thereof, as shown in FIGS. 2 to 4. For instance, the support member 50 may comprise a stiffener ring 52, which is radially spaced apart (inwardly) from the inner lobes 42, and a series of circumferentially spaced apart and radially extending mixer struts 54 which interconnect the stiffener ring 52 to at least some of the inner lobes 42. The stiffener ring 52 provides stiffness to the mixer lobes while structurally decoupling them from the turbine exhaust case inner body 27 to prevent the generation of thermal stress in operation.

Figure 1A:
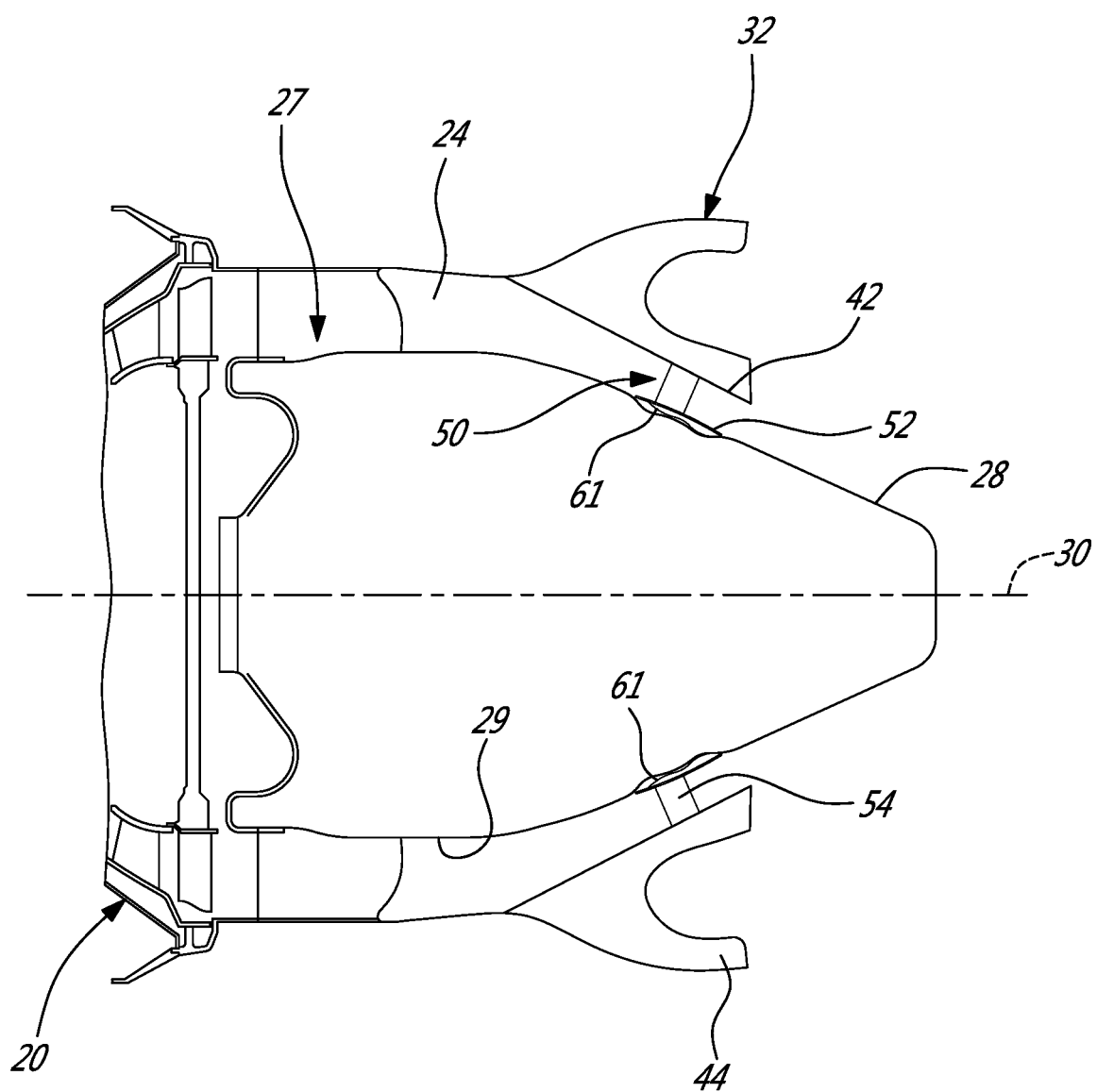
FIG. 1a is a schematic cross-section view of an exhaust mixer having a support member connected to mixer lobes, the support member being flexibly attached to the inner body of the engine case by an axially and radially flexible member.

As schematically shown in current FIGS. 1, 1a as well as in FIGS. 1 and 5 of applicant's U.S. Pat. No. 9,284,915, the entire content of which is herein incorporated by reference, the stiffener ring 52 may be located slightly radially inwardly of the predicted gas path profile in a recess in the outer surface 29 of the exhaust cone 28 or over a converging section of the exhaust cone (as illustrated in the drawings) so that the radially outer surface of the stiffener ring 52 is substantially align (i.e. flush) with an inner flow boundary wall profile of the engine main gaspath 26. In this way, the radially outer surface of the stiffener ring 52 forms a portion of inner flow boundary surface of the main gaspath.

As shown in FIGS. 2-4, the stiffener ring 52 is suspended from at least some of the inner lobes 42 by the struts 54. Such a floating ring arrangement where the stiffener ring 52 is none rigidly coupled to the turbine exhaust case inner structure (including the exhaust cone 28) may be used to prevent the transmission of loads to the mixer lobes 28 due thermal growth differential between turbine exhaust case inner structure and the mixer 32. However, complete decoupling of the mixer lobes from the inner body 27 may allow for dynamic activity involving the relative movement of the lobes relative the inner body 27 arising from a fluid structure interaction or other. In some situations, the resulting vibrations may cause high vibratory stresses and affect the part structural integrity.

Accordingly, it is herein proposed to attach the stiffener ring 52 to the exhaust cone 28 via an axially and radially flexible/resilient structure. For instance, as shown in FIGS. 2 to 4, the stiffener ring 52 could be attached to the exhaust cone 28 via circumferentially spaced-apart wavy blade members 61 including bend radii to act as spring blades in both axial and radial directions so as to accommodate thermal induced strains between the exhaust cone 28 and the exhaust mixer 32. However, the stiffness of the spring blades in the tangential/transversal direction (i.e. the circumferential direction) is selected to block dynamic displacements resulting from flow induced vibrations. The spring blades thus provide for limited freedom of movement in the radial and axial directions between the exhaust mixer 32 and the exhaust cone 28 while providing structural rigidity to act against fluid flow induced movement in the circumferential direction. This allows to suppress dynamic displacements involving lobes vs. exhaust cone 28 (resulting from flow induced vibrations) while allowing for relative thermal growth between the exhaust mixer and the engine inner body. The wavy blade members 61 cooperate to suppress or dampen mixer mode shapes that can result from a fluid interaction between the mixer and the gaspath flow without significantly increasing the thermal strains.

As shown in FIGS. 2 to 4, the wavy blade members 61 are suitably connected at a front or upstream end thereof to the stiffener ring 52 and at a rear or downstream end thereof to the exhaust cone 28. The stiffener ring 52 extends axially aft of blade members 61 to guide the inner boundary flow axially aft of the blade members 61. The connections between the ring 52 and blade members 61 may, for instance, be done by riveting (FIG. 2), welding (FIGS. 3 and 4) or other suitable means. As shown in FIG. 2, rivets 51 can be provided at the front and rear ends of the blade members 61 to respectively attach them to the stiffener ring 52 and the turbine exhaust case inner cone 28. As shown in FIG. 3, the front end of the blade members 61 can be welded to the radially inwardly facing surface of the stiffener ring 52 at weld site 53. Alternatively, the front end of the blade members 61 can be welded in a rearwardly open groove or pocket 55 formed on the radially inner surface of the stiffener ring 52. Various other mounting arrangements are contemplated as well. Also, it is understood that the flexible/resilient structure (e.g. the way spring blades 61) between the stiffener ring 52 and the exhaust cone 28 can adopt various forms and is, thus, not limited to the illustrated embodiments.

According to the illustrated embodiments, each wavy blade member 61 is shaped with first and second axially spaced-apart waves defining two successive waterfall-like steps between the front and rear ends of each member 61. As such, the front end of the blade member 61 is disposed at a higher radial height (radially outward) than the rear end. The radial body component of the wavy blade member 61 between the front and rear ends thereof provides the desired radial springiness. As can be appreciated from FIGS. 2 to 4, the underlying converging surface of the turbine exhaust case inner cone may have a similar wavy or stepped profile to accommodate the desired amount of radial movement of the stiffener ring 52 relative to the turbine exhaust case inner body. However, it is understood that the locally profiled surface of the inner body could have a profile different than that of the wavy blade member 61 as long as it provides the desired radial clearance to accommodate relative radial movement between the stiffener ring and the inner cone.

The front end of the wavy blade member 61 is disposed axially upstream of the rear end thereof. The axial body component of the wavy blade member 61 between its front and rear points of attachment provides the desired axial flexibility. It is understood that the wavy blade members 61 could have more or less than two waves to provide the desired axial and radial flexibility.

In the tangential or circumferential direction, the wavy blade member 61 can extend along an arc segment to jointly form a segmented flexible ring connector radially between the stiffener ring 52 and the inner body of the turbine exhaust case. Alternatively, a unitary flexible ring could be used to flexibly attach the stiffener ring 52 to the inner body of the turbine exhaust case.

As described in U.S. Pat. No. 9,284,915, the content of which is herein incorporated by reference, the support member 50 may be connected to each of the inner lobes 42, but in an alternate embodiment, the support member 50 may include fewer struts 54 than there are inner lobes 42 of the mixer 32 and, thus, only some of the inner lobes 42 have support struts 54 extending from the radially inner end thereof such as to directly connect these lobes 42 to the stiffener ring 52.

The struts 54 may be welded or brazed to the inner lobes 42, or alternatively may be fastened thereto using bolts, rivets or other suitable fasteners, for example. In the embodiment shown, the mixer struts 54 are axially located upstream of the downstream end (trailing edge) of the exhaust mixer 32.

Because the struts 54 extend through main gaspath 26, the struts 54 may have a generally aerodynamic profile for limiting any obstruction of the high velocity flows passing through the main gaspath 26. As seen in FIGS. 2 and 3, the finished shape of the struts 54 is generally elongated such that it extends a longitudinal length L in the direction of flow through the main gaspath 26 that is greater than the narrower transversal width W in a direction perpendicular to the direction of the flow through the main gaspath 26. In the illustrated embodiment the struts have a flat blade profile. The longitudinal length L of the struts 54 is thus significantly greater than the transversal width W, such that the transversal width W is minimized in order to reduce any turbulence caused in the flow through the main gas path 26 and to reduce back pressure.

As mentioned, the exhaust mixer 32 is solely connected to the engine 10 at the aft end 20b of the core engine casing 20 and via the wavy blade members 61. This mounting arrangement allows the lobes 42, 44 of the exhaust mixer 32 to vibrate at one or more modes in the engine operating frequency range, while remaining relatively stiff and without the stiffening ring or the support struts contacting the turbine exhaust case inner body (including the exhaust cone 28). In addition, the thermal variations in the exhaust mixer 32 due to the high and low velocity flows through the main gaspath 26 and the bypass passage 24 may cause axial and radial displacements in the mixer 32, which can accordingly be accommodated by wavy springs and absorbed by the exhaust mixer 32. Moreover, the downstream end of the mixer 32, which would otherwise be prone to deflection, is reinforced by the stiffener ring 52 which serves to increase the rigidity of the exhaust mixer 32 and, thus, inhibit movement at the downstream end 38 thereof in the circumferential direction. By joining all (or at least some of) the inner lobes 42 together with a stiffener ring 52, any movement of the exhaust mixer 32 is reduced, as are the vibrations thereof. In addition, by providing a stiffener ring 52 which is flexibly attached to the turbine exhaust case inner body, i.e. it is free to move relative thereto such as to absorb vibrations or thermal growth mismatches therebetween, the stiffener ring 52 is able to accommodate axial or radial displacements due to such thermal variations. As such, the exhaust mixer 32 provides enhanced rigidity and may accommodate thermal variations, vibrations and other axial and radial displacements, as required.

The above description is meant to be exemplary only, and one skilled in the art will recognize that changes may be made to the embodiments described without departing from the scope of the invention disclosed. For example, the invention may be used with various types of bypass gas turbine engines where two flow streams are mixed. Still other modifications which fall within the scope of the present invention will be apparent to those skilled in the art, in light of a review of this disclosure, and such modifications are intended to fall within the appended claims.

The invention claimes is:

1. A gas turbine engine comprising:
   a core gas path extending along an engine axis;
   a bypass gas path surrounding the core gaspath;
   a turbine exhaust case inner body having an outer surface defining a portion of a radially inner flow boundary wall of the core gaspath; and
   a lobed exhaust mixer surrounding at least a portion of the turbine exhaust case inner body and defining an intermediate wall between the core gaspath and the bypass gas path, the lobed exhaust mixer including: lobes, a stiffener ring, a plurality of circumferentially spaced-apart struts extending from the stiffener ring to at least some of the lobes, and at least one spring extending from a radially inner surface the stiffener ring to a radially outer surface of the turbine exhaust case inner body.

2. The gas turbine engine defined in claim 1, wherein the at least one spring has both a radial spring component and an axial spring component.

3. The gas turbine engine defined in claim 2, wherein the at least one spring has a front end connected to the stiffener ring and a rear end connected to the turbine exhaust case inner body, the front end being disposed axially forward and radially outward relative to the rear end.

4. The gas turbine engine defined in claim 3, wherein the at least one spring has a stepped profile.

5. The gas turbine engine defined in claim 4, where the stepped profile defines at least one wave between the front end and the rear end of the at least one spring.

6. The gas turbine engine defined in claim 4, wherein the radially outer surface of the turbine exhaust case inner body has a locally stepped profile underneath the at least one spring.

7. The gas turbine engine defined in claim 3, wherein the at least one spring has a stiffness in a circumferential direction selected to resist dynamic displacement of the stiffener ring resulting from flow induced vibrations during engine operation.

8. The gas turbine engine defined in claim 7, wherein the at least one spring extends along an arc of a circle in a circumferential direction.

9. The gas turbine engine defined in claim 8, wherein the at least one spring comprises a plurality of circumferentially distributed wavy blade members forming a circumferentially segment ring structure.

10. A gas turbine engine having an engine casing enclosing a compressor section, a combustor and a turbine section defining a main gas path axially extending therethrough, and comprising:
an exhaust cone disposed downstream of the turbine section;
an exhaust mixer cantilevered from the engine casing and cooperating with the exhaust cone such as to define a portion of the main gas path therebetween, the exhaust mixer having a plurality of circumferentially distributed lobes connected at a radially inner side by a stiffener ring; and
a set of circumferentially spaced-apart spring blades having respective front ends attached to the stiffener ring and respective rear ends attached to the exhaust cone, the front ends being positioned axially forward and radially outward of the rear ends, the spring blades jointly forming an axially and radially flexible segmented ring structure between the stiffener ring and the exhaust cone.

11. The gas turbine engine defined in claim 10, wherein the spring blades have a wavy converging profile.

12. The gas turbine engine defined in claim 11, wherein at least some of the spring blades include bend radii.

13. The gas turbine engine defined in claim 11, wherein the exhaust cone has a locally wavy converging profile underneath the spring blades.

14. The gas turbine engine defined in claim 10, wherein the stiffener ring has a radially outer surface forming part of an inner flow boundary wall of the gas path, and wherein the stiffener ring extends axially aft of the rear end of the spring blades.

15. The gas turbine engine defined in claim 10, wherein a rearwardly open pocket is formed on a radially inner surface of the stiffener ring for receiving the front ends of the spring blades.

16. The gas turbine engine defined in claim 10, wherein the front ends of the spring blades are rigidly attached to a front end of the stiffener ring, the spring blades extending axially rearwardly and radially inwardly from the front end of the stiffener ring.

17. The gas turbine engine defined in claim 10, wherein the stiffener ring is supported in the gas path by struts extending radially inwardly from at least some of the lobes of the exhaust mixer.

18. The gas turbine engine defined in claim 16, wherein the front ends of the spring blades are welded to the stiffener ring inside the rearwardly open pocket.

19. The gas turbine engine defined in claim 10, wherein spring blades are riveted at the rear ends thereof to the exhaust cone.

20. The gas turbine engine defined in claim 10, wherein the spring blades extends from a radially inner surface of the stiffener ring to a radially outer surface of the exhaust cone.

* * * * *